US009927861B2

(12) United States Patent
Yokoyama

(10) Patent No.: US 9,927,861 B2
(45) Date of Patent: Mar. 27, 2018

(54) INFORMATION PROCESSING APPARATUS OPERABLE IN POWER SAVING MODE AND METHOD FOR CONTROLLING THE SAME

(71) Applicant: CANON KABUSHIKI KAISHA, Tokyo (JP)

(72) Inventor: Junnosuke Yokoyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/105,039

(22) Filed: Dec. 12, 2013

(65) Prior Publication Data
US 2014/0173315 A1 Jun. 19, 2014

(30) Foreign Application Priority Data
Dec. 14, 2012 (JP) ................. 2012-273639

(51) Int. Cl.
*G06F 1/00* (2006.01)
*G06F 1/32* (2006.01)
*H04N 1/00* (2006.01)

(52) U.S. Cl.
CPC .......... *G06F 1/3234* (2013.01); *G06F 1/3231* (2013.01); *H04N 1/00411* (2013.01);
(Continued)

(58) Field of Classification Search
CPC .... G06F 1/3287; G06F 9/4401; G06F 1/3203; G06F 1/3231; G06F 1/3234;
(Continued)

(56) References Cited

U.S. PATENT DOCUMENTS 7,165,223 B2 * 1/2007 Kutaragi ................. A63F 13/10
715/745
7,689,820 B2 * 3/2010 Pierce ................... G06F 9/4405
712/203
(Continued)

FOREIGN PATENT DOCUMENTS

JP 2003-005734 A 1/2003
JP 2003-141501 A 5/2003
(Continued)

*Primary Examiner* — Thomas Lee
*Assistant Examiner* — Zhipeng Wang
(74) *Attorney, Agent, or Firm* — Canon U.S.A., Inc. IP Division

(57) ABSTRACT

In an information processing apparatus operable in a power saving mode, a sub CPU reads out initial screen data pre-stored in a nonvolatile memory, and displays it on a display screen when the information processing apparatus returns from the power saving mode. Further, the sub CPU detects coordinate data of an area touched by a user on the initial screen, and stores it into the nonvolatile memory. Simultaneously, a main CPU performs startup processing such as setting the whole apparatus. After completing the startup processing, the main CPU reads out the coordinate data stored in the nonvolatile memory, identifies a function selected by the user, and performs an identified operation. Further, the main CPU generates display screen data corresponding to a determination of the function selected by the user to transfer it to an operation unit controller, and transmits a screen switching instruction to the operation unit controller.

9 Claims, 10 Drawing Sheets

(52) U.S. Cl.
CPC ..... *H04N 1/00896* (2013.01); *H04N 1/00928* (2013.01); *H04N 2201/0094* (2013.01); *Y02B 60/1289* (2013.01)

(58) Field of Classification Search
CPC ....... H04N 2201/0094; H04N 1/00928; H04N 1/00885; H04N 1/00411; H04N 1/00896
See application file for complete search history.

(56) References Cited

U.S. PATENT DOCUMENTS

| | | | | |
|---|---|---|---|---|
| 8,804,039 | B2* | 8/2014 | Kim | G06F 9/4401 348/552 |
| 2003/0107600 | A1* | 6/2003 | Kwong | G06F 21/31 715/764 |
| 2006/0294358 | A1* | 12/2006 | Wang | G06F 9/4406 713/2 |
| 2007/0171449 | A1* | 7/2007 | Tanno | G06F 3/1204 358/1.13 |
| 2008/0077786 | A1* | 3/2008 | Pierce | G06F 9/4405 713/2 |
| 2009/0089260 | A1* | 4/2009 | Chong | G06Q 20/102 |
| 2010/0070750 | A1* | 3/2010 | Yamamoto | G06F 9/4411 713/2 |
| 2010/0070751 | A1* | 3/2010 | Chu | G06F 9/445 713/2 |
| 2010/0141685 | A1* | 6/2010 | Lee | G09G 5/395 345/667 |
| 2010/0165017 | A1* | 7/2010 | Lester | B41J 29/393 347/5 |
| 2010/0262853 | A1* | 10/2010 | Goda | G06F 9/461 713/323 |
| 2010/0325409 | A1* | 12/2010 | Kim | G06F 9/4401 713/2 |
| 2011/0055538 | A1* | 3/2011 | Cho | G06F 9/4418 713/2 |
| 2011/0087871 | A1* | 4/2011 | Kwon | G06F 1/3203 713/2 |
| 2012/0044351 | A1* | 2/2012 | Kook | B60K 35/00 348/148 |
| 2012/0086857 | A1* | 4/2012 | Kim | G06F 9/4401 348/563 |
| 2013/0054945 | A1* | 2/2013 | Free | G06F 1/3203 713/2 |
| 2013/0311762 | A1* | 11/2013 | Bank | G06F 9/4401 713/2 |

FOREIGN PATENT DOCUMENTS

| | | |
|---|---|---|
| JP | 2007-030274 A | 2/2007 |
| JP | 2008-160413 A | 7/2008 |
| JP | 2009-135873 A | 6/2009 |
| JP | 2010-166482 A | 7/2010 |
| JP | 2011-104790 A | 6/2011 |
| JP | 2012-236327 A | 12/2012 |

* cited by examiner

FIG. 5

| RANGE OF X COORDINATE VALUE | RANGE OF Y COORDINATE VALUE | FUNCTION |
|---|---|---|
| x1 to x2 | y1 to y2 | WEB BROWSER |
| x1 to x2 | y3 to y4 | FAX |
| x1 to x2 | y5 to y6 | COPY |
| x3 to x4 | y1 to y2 | SETTING/ REGISTRATION |
| x3 to x4 | y3 to y4 | BOX |
| x3 to x4 | y5 to y6 | SCAN |
| OTHER RANGES | OTHER RANGES | INVALID (PROCESSING IS UNNECESSARY) |

INFORMATION PROCESSING APPARATUS OPERABLE IN POWER SAVING MODE AND METHOD FOR CONTROLLING THE SAME

BACKGROUND OF THE INVENTION

Field of the Invention

The present invention relates to a technique that allows an information processing apparatus operable in a power saving mode to reduce a time required until an operation unit becomes operable when the information processing apparatus returns from the power saving mode.

Description of the Related Art

Conventionally, a multifunction peripheral, which is provided with a scanning function, a printing function, a facsimile function, a document transmission function, and the like, has included an operation unit for displaying an operation screen. A main central processing unit (CPU) of the multifunction peripheral is in charge of main control of the operation unit.

Such a multifunction peripheral shifts to a power saving mode under a certain condition to reduce power consumption. In the power saving mode, the multifunction peripheral stops power supply to the operation unit and respective devices such as a scanner and a printer. Then, upon detecting a factor for returning from the power saving mode (for example, when a switch on the operation unit is pressed), the multifunction peripheral starts power supply to the devices that have been out of operation.

A return from the power saving mode requires a certain time until an initial screen is displayed on the operation unit, because the main CPU performs startup processing on the respective devices. For example, the main CPU performs the startup processing on the devices that have been out of operation, and checks the statuses of the respective devices in the multifunction peripheral when the multifunction peripheral returns from the power saving mode. As a result, processing loads are concentrated on the main CPU during the return from the power saving mode. Because the main CPU displays the screen on the operation unit after completing this startup processing, a user is kept waiting until the initial screen is displayed.

Therefore, an image processing apparatus discussed in Japanese Patent Application Laid-Open No. 2003-141501 employs a configuration in which, when it is difficult for a main CPU to directly control drawing on a liquid crystal display (LCD) of an operation unit, a sub CPU, which operates independently from an operation state of the main CPU, directly draws an initial screen on the operation unit.

However, although the configuration discussed in Japanese Patent Application Laid-Open No. 2003-141501 allows the initial screen to be quickly displayed on the operation unit when the image processing apparatus returns from the power saving mode, the image processing apparatus cannot receive a user's operation via the initial screen until the main CPU completes the startup processing.

SUMMARY OF THE INVENTION

The present invention is directed to an information processing apparatus operable in the power saving mode, which is capable of reducing a time required until an operation unit becomes operable when returning from the power saving mode.

According to an aspect of the present invention, an information processing apparatus includes a main control unit, a display control unit configured to display a screen on an operation unit, a storage unit configured to store operation information received from a user via the screen displayed on the operation unit, and a power supply unit configured to supply power to the main control unit and the display control unit. The power supply unit supplies power to the main control unit and the display control unit in response to an instruction from the operation unit or a human sensor. The display control unit displays an initial screen on the operation unit, and stores the operation information received from the user via the initial screen into the storage unit while the main control unit is performing apparatus startup processing. The main control unit starts the apparatus startup processing in response to power supply from the power supply unit, and performs predetermined processing based on the operation information stored in the storage unit after completing the startup processing.

Exemplary embodiments of the present invention reduce the time required until the operation unit becomes operable when the apparatus returns from the power saving mode. As a result, it is possible to reduce the time required until the operation unit of the apparatus becomes operable when the apparatus returns from the power saving mode.

Further features of the present invention will become apparent from the following description of exemplary embodiments with reference to the attached drawings.

BRIEF DESCRIPTION OF THE DRAWINGS

FIG. 5 is a table indicating relationships between coordinate data on the function selection screen and functions according to the first exemplary embodiment.

DESCRIPTION OF THE EMBODIMENTS

Various exemplary embodiments, features, and aspects of the invention will be described in detail below with reference to the drawings.

Figure 1:
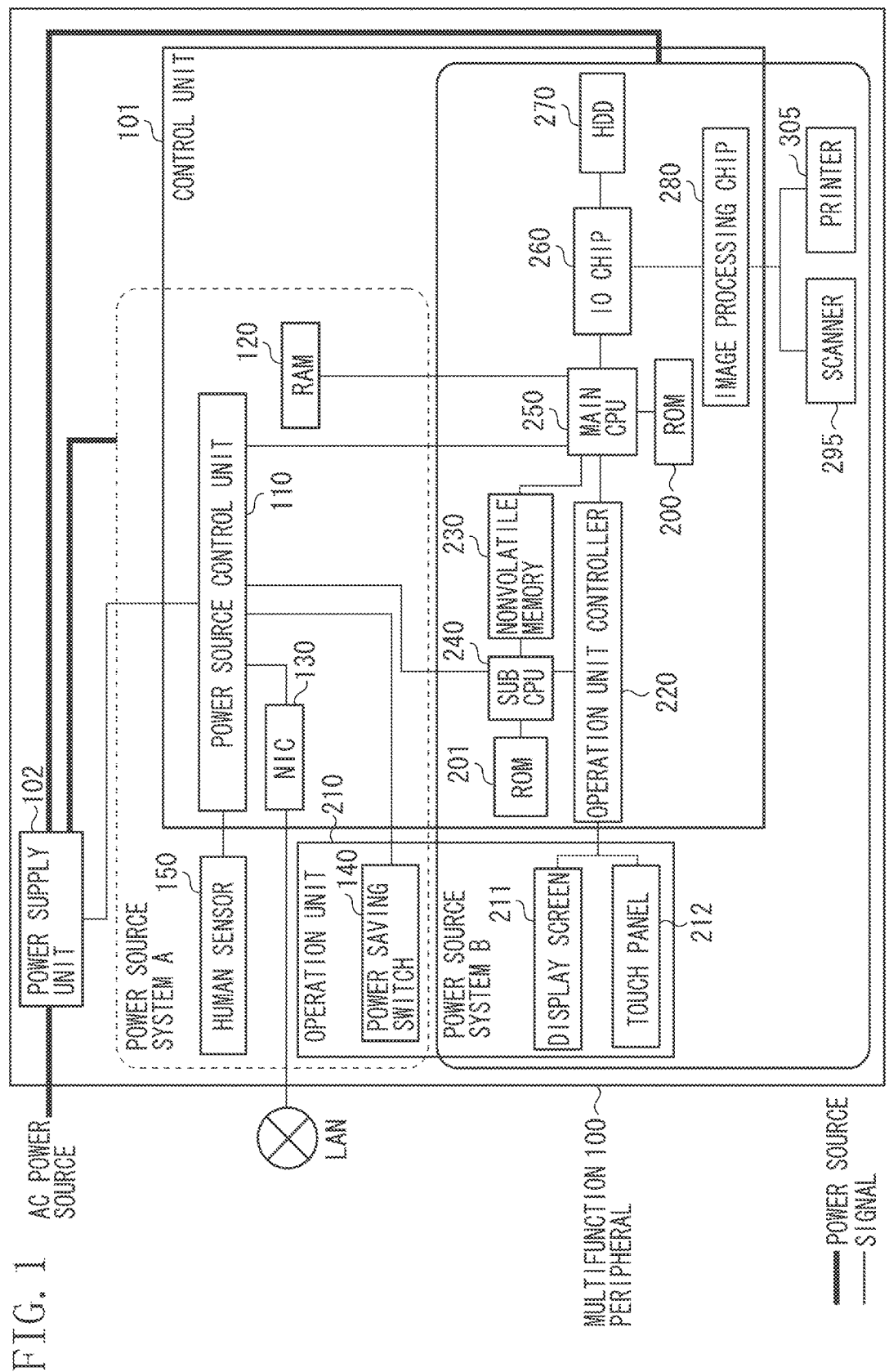
FIG. 1 illustrates a hardware configuration of a multifunction peripheral according to a first exemplary embodiment.

FIG. 1 illustrates a hardware configuration of a multifunction peripheral according to a first exemplary embodiment. The multifunction peripheral in the present exemplary embodiment is an example of an information processing apparatus. The present exemplary embodiment will be described based on the multifunction peripheral, but the information processing apparatus may be embodied by any single-function information processing apparatus that performs any one of scanning, printing, facsimile, or document transmission.

Referring to FIG. 1, first, a multifunction peripheral 100 includes a main CPU 250 that controls the whole apparatus. The main CPU 250 controls the multifunction peripheral 100 by executing a program stored in a hard disk drive (HDD) 270 or a read only memory (ROM) 200.

The ROM 200 is a storage unit storing an initial startup program, which is executed by the main CPU 250. A random access memory (RAM) 120 is used as a work memory that allows the main CPU 250 to operate. When power is supplied from a power supply unit 102, first, the main CPU 250 reads out the initial startup program stored in the ROM 200 and executes it. After that, the main CPU 250 reads out a program from the HDD 270 to start system startup processing (for example, initialization of an input/output (IO)) chip 260 and the HDD 270), and checks whether a scanner 295 and a printer 305 can operate normally. The main CPU 250 functions as a main control unit that controls the information processing apparatus.

Further, the multifunction peripheral 100 includes a sub CPU 240 that controls an operation unit controller 220. The sub CPU 240 causes screen data stored in a nonvolatile memory 230 to be displayed on an operation unit 210 (controls a display of the operation unit 210) while the main CPU 250 is performing the above-described startup processing and is checking statuses of the scanner 295 and the printer 305. A ROM 201 is a storage unit storing a program that is executed by the sub CPU 240. When power is supplied from the power supply unit 102, the sub CPU 240 reads out the program stored in the ROM 201 and executes it. The operation unit controller 220 displays a screen on the operation unit 210 based on the transferred screen data. Further, upon detecting a user's touch on a touch panel 212, the operation unit controller 220 detects which coordinates are pressed, and transfers the coordinate data to the sub CPU 240 as operation information. The operation unit controller 220 switches the display from a screen currently displayed on the operation unit 210 to a screen based on the screen data received together with a screen switching instruction. The sub CPU 240 and the operation unit controller 220 function as a display control unit that controls the operation unit 210.

Further, the multifunction peripheral 100 includes the operation unit 210 for displaying operation screens including an initial screen. The operation unit 210 includes a display screen 211 that displays screen data transferred from the operation unit controller 220, and the touch panel 212 for receiving an operation from a user. Further, the operation unit 210 includes a power saving switch 140 that allows the user to issue an instruction for returning from the power saving mode to a normal power mode.

Further, the multifunction peripheral 100 includes a human sensor 150 that detects user's approach to the multifunction peripheral 100. Desirably, the human sensor 150 is embodied by a passive sensor to reduce power consumption while the multifunction peripheral 100 operates in the power saving mode. However, the human sensor 150 may be embodied by an active sensor. If the human sensor 150 is embodied by an active sensor, the multifunction peripheral 100 uses a microcomputer dedicated for control of the human sensor 150. When a human (user) approaches the multifunction peripheral 100, the human sensor 150 transmits an interruption signal to a power source control unit 110. Upon receiving this interruption signal, the power source control unit 110 instructs the power supply unit 102, and controls the power supply unit 102 so as to supply power to respective units in a power source system B, which will be described below.

Further, the multifunction peripheral 100 includes a network interface card (NIC) 130 for communication with another multifunction peripheral or a personal computer (PC) via a network such as a local area network (LAN). The NIC 130 functions as a communication unit that processes a packet transmitted to or received from the LAN.

The HDD 270 stores application programs that provide various kinds of functions of the multifunction peripheral 100. The HDD 270 stores a copying application for exerting the copying function, a scanning application for transmitting a scanned image to another multifunction peripheral or a PC, a facsimile application for transmitting facsimile data, and the like. Further, in the present exemplary embodiment, the HDD 270 also stores a box application for storing image data that the scanner 295 generates by reading a document, and data written in a page description language (PDL) (a PDL document) received from a PC into a storage area called a box. Further, in the present exemplary embodiment, the HDD 270 also stores a web browser for displaying a web page based on HyperText Markup Language (HTML) data received from a web server or the like, and uploading a document stored in the multifunction peripheral 100 to the web server.

Further, the multifunction peripheral 100 includes the IO chip 260 as a chip that controls input into and output from the printer 305 and the scanner 295. The printer 305 is a printing unit that prints an image on a print sheet. The scanner 295 is a reading unit that reads a document to generate image data. Further, the multifunction peripheral 100 includes an image processing chip 280 that performs correction, processing, editing, conversion of a resolution, and the like on image data read and input by the scanner 295, and image data to be output to the printer 305.

The multifunction peripheral 100 illustrated in FIG. 1 operates in any one of the normal power mode and the power saving mode. The normal power mode is a power mode in which power is supplied to all devices illustrated in FIG. 1. In other words, the normal power mode is a power mode in which power is supplied to devices included in a power source system A and the power source system B illustrated in FIG. 1. On the other hand, the power saving mode is a power mode in which power is supplied to the devices included in the power source system A illustrated in FIG. 1 but power is not supplied to the devices included in the power source system B illustrated in FIG. 1.

The power source control unit 110 switches the power mode. When an interruption signal is output from the human sensor 150, the power saving switch 140, or the like while the multifunction peripheral 100 is in the power saving mode, the power source control unit 110 instructs the power supply unit 102 to supply power to the devices in the power source system B including the main CPU 250 and the sub CPU 240. As a result, the multifunction peripheral 100 shifts from the power saving mode to the normal power mode.

Next, an operation of the multifunction peripheral 100 will be described.

When power is supplied, the main CPU 250 reads out the initial startup program from the ROM 200, and initializes the IO chip 260 and the HDD 270. After the initialization of these devices, the main CPU 250 reads out the startup program from the HDD 270, and starts the system startup processing. Further, while the main CPU 250 is performing the startup processing, the sub CPU 240 performs the following processing. When power is supplied, the sub CPU 240 executes the program stored in the ROM 201, and reads out initial screen data from the nonvolatile memory 230 to transfer it to the operation unit controller 220. Upon receiving the initial screen data, the operation unit controller 220 displays the initial screen on the display screen 211 of the operation unit 210.

Further, upon receiving a power supply stop signal from the main CPU 250 or the sub CPU 240 while the multifunction peripheral 100 is in the normal power mode, the power source control unit 110 instructs the power supply unit 102 to stop power supply to the devices included in the power source system B.

Figure 2:
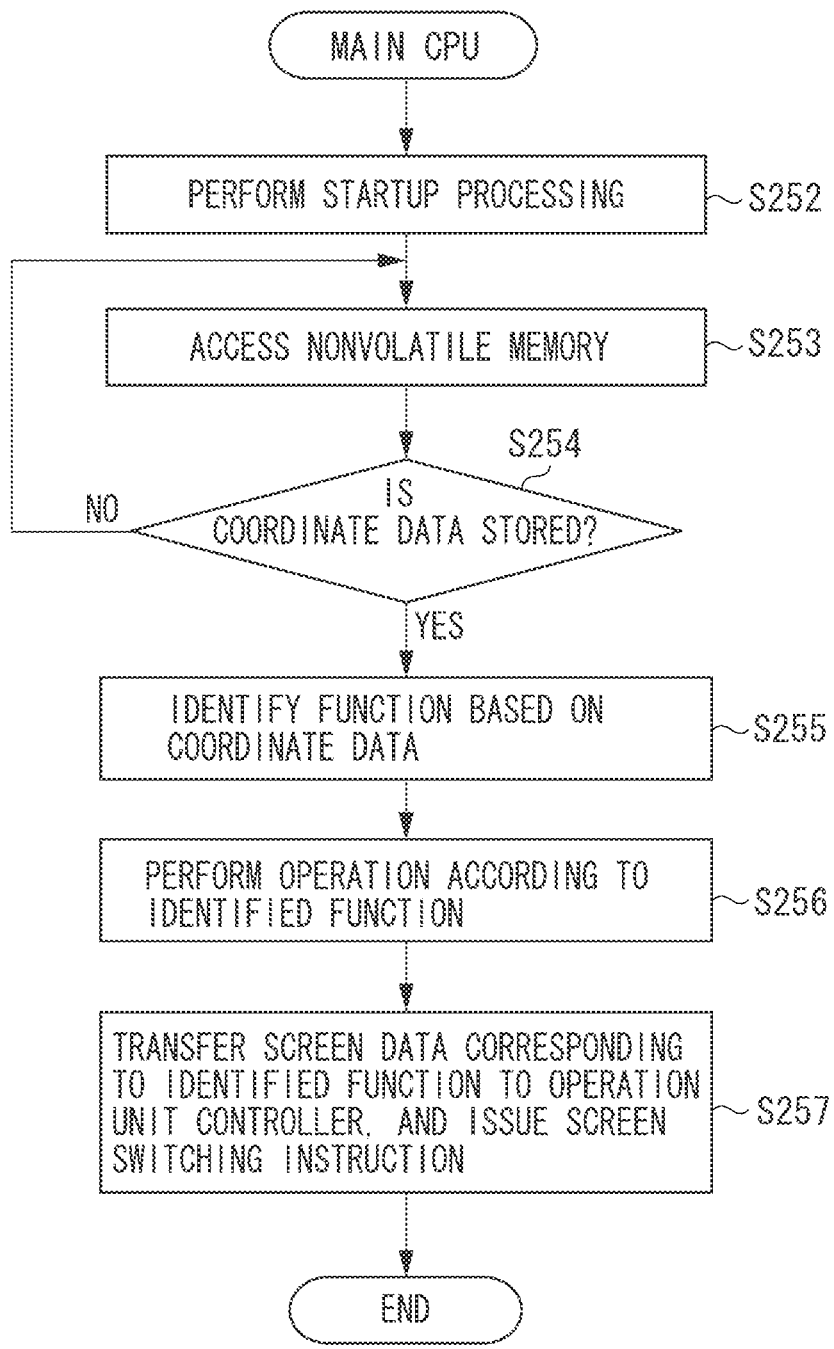
FIG. 2 is a flowchart illustrating an operation of a main CPU according to the first exemplary embodiment.
Figure 3:
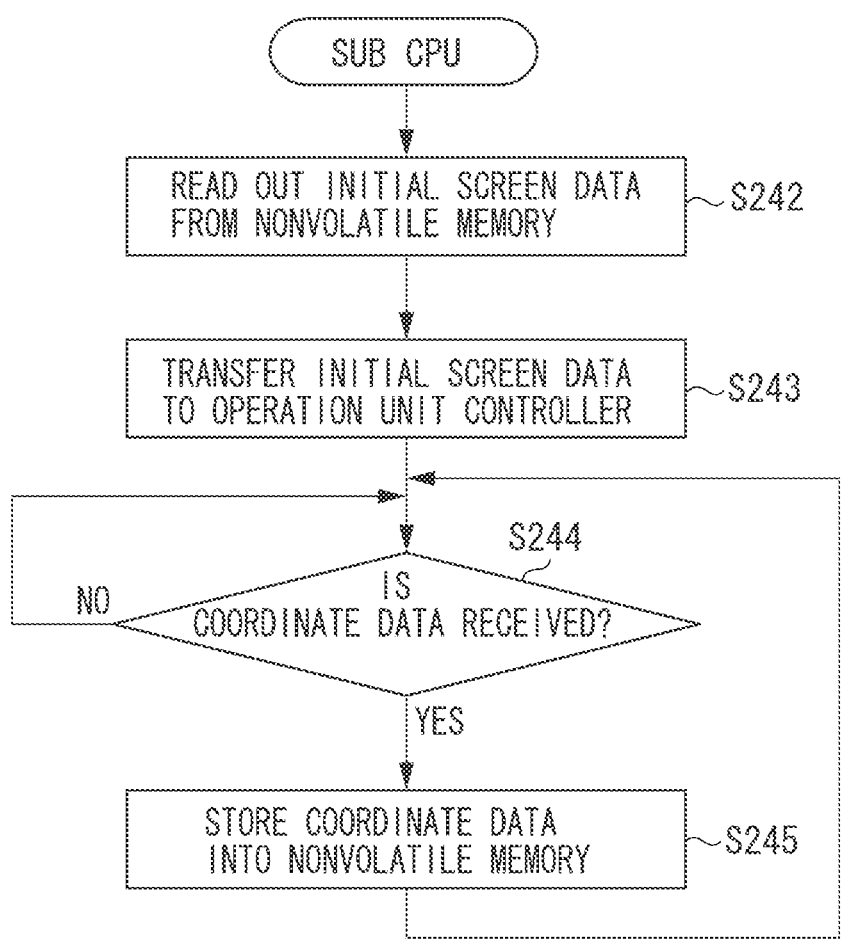
FIG. 3 is a flowchart illustrating an operation of a sub CPU according to the first exemplary embodiment.

FIGS. 2 and 3 are flowcharts illustrating operations when the multifunction peripheral 100 according to the first exemplary embodiment shifts from the power saving mode to the normal power mode. In particular, FIG. 2 is a flowchart illustrating an operation of the main CPU 250, and FIG. 3 is a flowchart illustrating an operation of the sub CPU 240. The flowcharts of FIGS. 2 and 3 are simultaneously performed in parallel with each other in response to power supply from the power supply unit 102.

FIG. 2 is a flowchart illustrating an operation of the main CPU 250 illustrated in FIG. 1. The processing illustrated in the flowchart of FIG. 2 starts in response to power supply from the power supply unit 102.

When power is supplied from the power supply unit 102, in step S252, the main CPU 250 performs the startup processing. More specifically, the main CPU 250 reads out the startup program stored in the ROM 200, and initializes the IO chip 260 and the HDD 270. After the initialization of these devices, the main CPU 250 reads out the program from the HDD 270, and starts system setting processing. Subsequently, the main CPU 250 monitors the statuses of the respective devices such as the printer 305 and the scanner 295, and checks whether these devices can operate normally.

After completion of the startup processing in step S252, in step S253, the main CPU 250 accesses the nonvolatile memory 230. In step S254, the main CPU 250 determines whether coordinate data is stored in the nonvolatile memory 230. The coordinate data is operation information indicating coordinates where the user touches the touch panel 212 of the operation unit 210, and is constituted by an X component and a Y component.

If the coordinate data is stored in the nonvolatile memory 230 as the operation information (YES in step S254), the main CPU 250 determines that the user has performed a specific operation on the screen displayed on the operation unit 210. Then, the processing proceeds to steps S255 to S257 so that the main CPU 250 performs predetermined processing based on this coordinate data. On the other hand, if the coordinate data is not stored in the nonvolatile memory 230 (NO in step S254), the main CPU 250 waits for a certain time period, and then, the processing returns to step S253 so that the main CPU 250 accesses the nonvolatile memory 230 again.

In step S255, the main CPU 250 identifies the function selected by the user based on the coordinate data stored in the nonvolatile memory 230, and a determination table illustrated in FIG. 5. The determination table illustrated in FIG. 5 is stored in the HDD 270.

The main CPU 250 makes a determination by referring to the table illustrated in FIG. 5 in the following manner. If the X component of the coordinate data of an area where the user touches the touch panel 212 is within a range of x1 to x2, and the Y component is within a range of y1 to y2, the main CPU 250 determines that a web browser function is selected. Further, if the X component of the coordinates of the area where the user touches the touch panel 212 is within the range of x1 to x2, and the Y component is within a range of y3 to y4, the main CPU 250 determines that a facsimile function is selected.

Further, if the X component of the coordinates of the area where the user touches the touch panel 212 is within the range of x1 to x2, and the Y component is within a range of y5 to y6, the main CPU 250 determines that the copying function is selected. Further, if the X component of the coordinates of the area where the user touches the touch panel 212 is within a range of x3 to x4, and the Y component is within the range of y1 to y2, the main CPU 250 determines that a setting/registration function is selected. Further, if the X component of the coordinates of the area where the user touches the touch panel 212 is within the range of x3 to x4, and the Y component is within the range of y3 to y4, the main CPU 250 determines that a box function is selected. Further, if the X component of the coordinates of the area where the user touches the touch panel 212 is within the range of x3 to x4, and the Y component is within the range of y5 to y6, the main CPU 250 determines that a scanning function is selected.

After identifying the function selected by the user, in step S256, the main CPU 250 performs the predetermined processing corresponding to the identified function. For example, if the selected function is identified as the copying function, the main CPU 250 controls the scanner 295 and the printer 305 to carry out a copying operation as the predetermined processing. Further, if the selected function is identified as the scanning function, the main CPU 250 controls the scanner 295 to, for example, store/transfer image data acquired by reading a document, as the predetermined processing. Then, in step S257, the main CPU 250 generates screen data corresponding to the function identified in step S255, and transfers the generated screen data to the operation unit controller 220. Further, the main CPU 250 issues a screen switching instruction to the operation unit controller 220.

In the present example, the coordinate data is stored in the nonvolatile memory 230. However, information indicating the function selected by the user may be stored in the nonvolatile memory 230.

Upon completing the predetermined processing in steps 255 to S257, the main CPU 250 starts controlling the multifunction peripheral 100 to shift to the power saving mode, and controls the RAM 120 to shift to a self-refresh operation while saving the status of the apparatus into the RAM 120, thereby reducing power consumed by the multifunction peripheral 100. Upon the shift of the RAM 120 to the self-refresh operation, the main CPU 250 transmits a power supply stop signal to the power source control unit 110 to change the state of power supply to the apparatus to the power saving mode. Upon receiving the power supply stop signal, the power source control unit 110 instructs the power supply unit 102 to stop power supply to the devices included in the power source system B. As a result, the multifunction peripheral 100 shifts from the normal power mode to the power saving mode.

FIG. 3 is a flowchart illustrating a processing procedure that the sub CPU 240 performs by reading out the program stored in the ROM 201. The processing illustrated in the flowchart of FIG. 3 starts in response to power supply from the power supply unit 102.

When power is supplied from the power supply unit 102, in step S242, the sub CPU 240 reads out the initial screen data stored in the nonvolatile memory 230. In step S243, the sub CPU 240 transfers this initial screen data to the operation unit controller 220. Upon receiving the screen data from the sub CPU 240, the operation unit controller 220 displays the initial screen illustrated in FIG. 4 on the operation unit 210.

Figure 4:
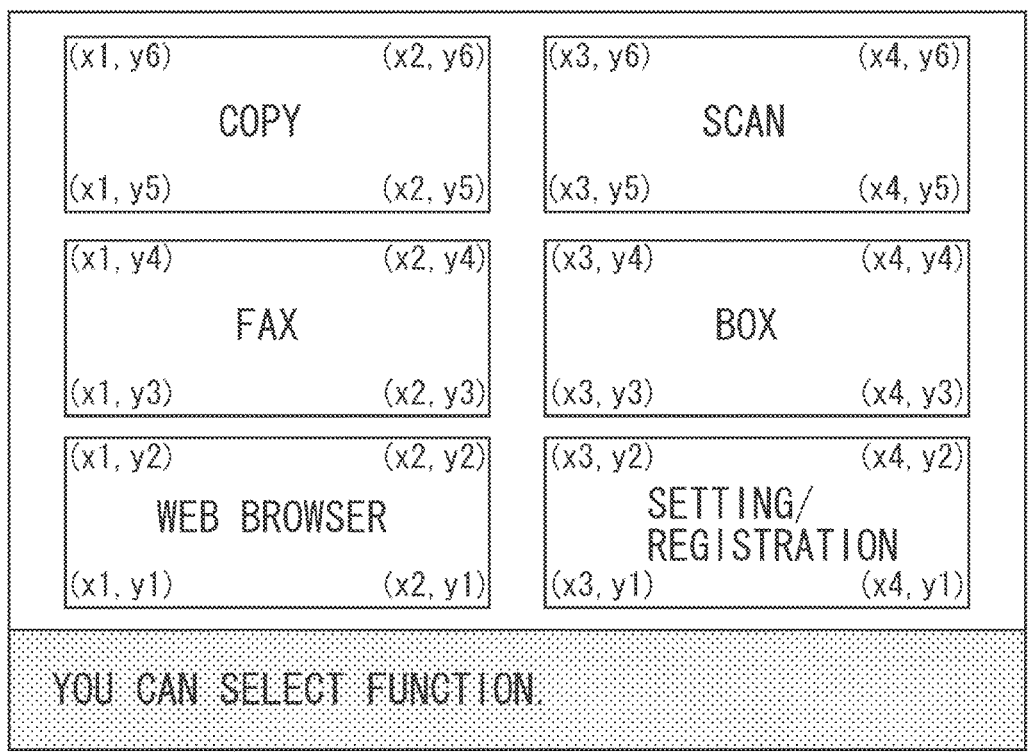
FIG. 4 illustrates an example of a function selection screen according to the first exemplary embodiment.

FIG. 4 illustrates an example of the initial screen displayed in step S243. For convenience of the description, the illustration of FIG. 4 contains labels (xn, yn) as the coordinate data, but these labels are not displayed on the actual screen. Upon detecting that the touch panel 212 is pressed by the user, the operation unit controller 220 notifies the sub CPU 240 of the coordinate data. The coordinate data is stored in the nonvolatile memory 230, and is referred to by the main CPU 250. The main CPU 250 receives the coordinate data from the nonvolatile memory 230, and identifies which function is selected by the user based on the determination table illustrated in FIG. 5. Then, the main CPU 250 causes the screen corresponding to the identified function to be displayed on the operation unit 210, and controls the respective devices such as the image processing chip 280 to carry out a copying operation, a printing operation, a facsimile operation, a transmission operation, or the like.

Referring back to FIG. 3, in step S244, the sub CPU 240 waits for reception of the coordinate data from the operation unit controller 220. If the sub CPU 240 receives the coordinate data (YES in step S244), the processing proceeds to step S245. In step S245, the sub CPU 240 stores the received coordinate data into the nonvolatile memory 230.

According to the first exemplary embodiment, the initial screen can be quickly displayed on the screen of the operation unit 210 by the sub CPU 240 controlling the display when the multifunction peripheral 100 returns from the power saving mode. As a result, the user can operate the operation unit 210 without being kept waiting while the main CPU 250 (the main control unit) performs the system startup processing and checks the statuses of the scanner 295/the printer 305. Further, the multifunction peripheral 100 is configured in such a manner that the coordinate data of the area where the user touches on the displayed initial screen is stored in the nonvolatile memory 230, and the main CPU 250 can refer thereto, whereby the screen can be switched to a next screen immediately after the main CPU 250 completes the apparatus startup processing.

Further, according to the first exemplary embodiment, the multifunction peripheral 100 is configured in such a manner that power is supplied to the sub CPU 240 based on a human detection signal (an interruption signal) received from the human sensor 150. Therefore, the initial screen can be displayed in response to human's approach to the multifunction peripheral 100.

Next, a second exemplary embodiment will be described with reference to FIGS. 6 to 8. The second exemplary embodiment is different from the first exemplary embodiment in terms that the power source system to which power is supplied from the power supply unit 102 is divided into an increased number of power source systems.

Figure 6:
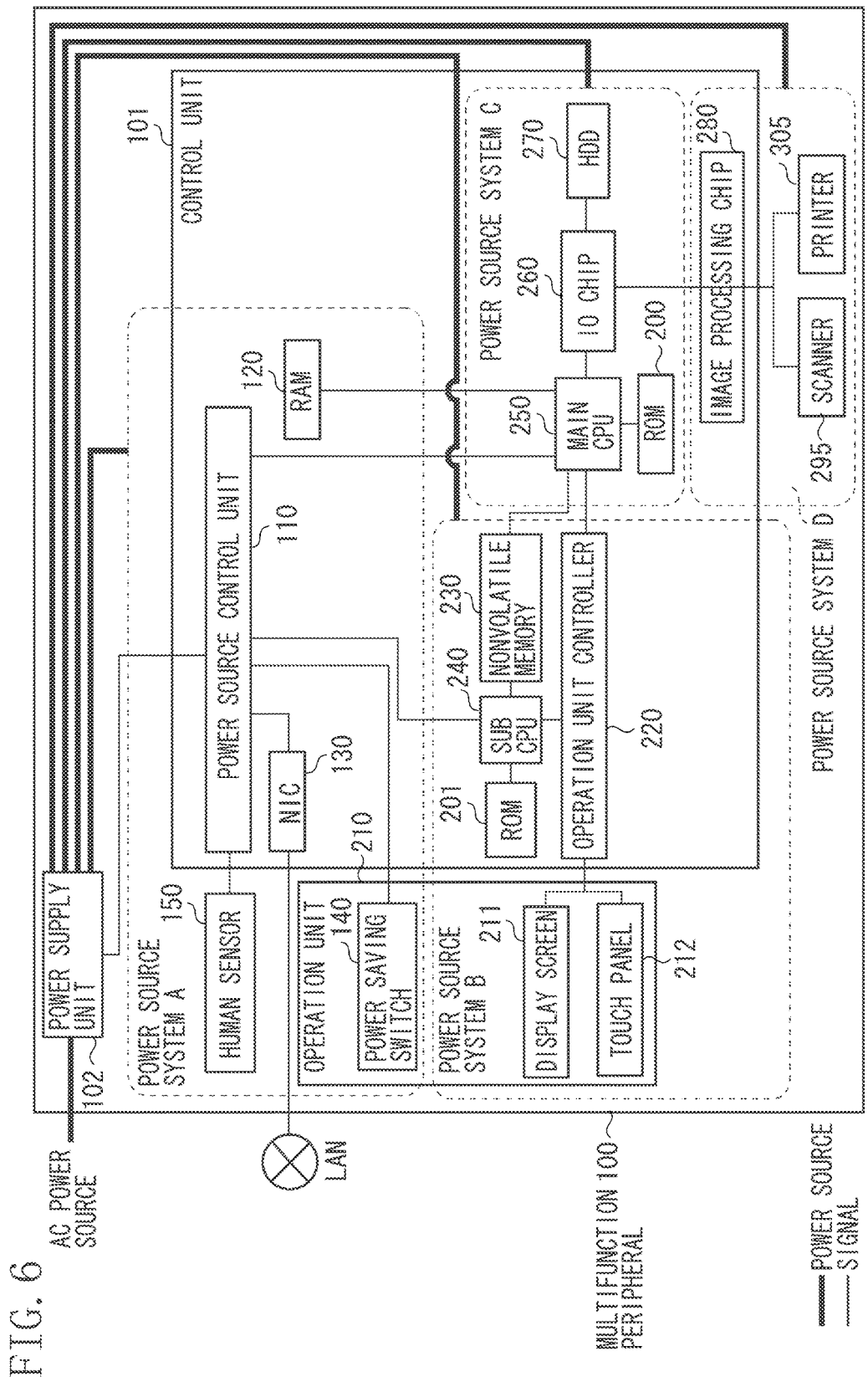
FIG. 6 illustrates a hardware configuration of a multifunction peripheral according to a second exemplary embodiment.

FIG. 6 is a block diagram illustrating a hardware configuration of the multifunction peripheral 100 according to the second exemplary embodiment. In FIG. 6, similar blocks to the first exemplary embodiment are denoted by the same reference numerals.

In the second exemplary embodiment, the multifunction peripheral 100 has four power modes, namely, the normal power mode, a first power saving mode, a second power saving mode, and a third power saving mode. The multifunction peripheral 100 operates in any one of these four power modes. The normal power mode is a power mode in which power is supplied to all devices illustrated in FIG. 6.

In other words, the normal power mode is a power mode in which power is supplied to all of devices included in power source systems A to D illustrated in FIG. 6.

On the other hand, the first power saving mode is a power mode in which the power supply unit 102 supplies power to the devices included in the power source systems A to C among the devices illustrated in FIG. 6 but stops power supply to the devices included in the power source system D. In the first power saving mode, the power supply unit 102 supplies power to main hardware such as the main CPU 250 that controls the multifunction peripheral 100, and the sub CPU 240 that controls the operation unit 210. However, the power supply unit 102 stops power supply to the image input/output devices such as the scanner 295 and the printer 305, and image processing chip 280 for these image input/output devices.

Further, the second power saving mode is a power mode in which the power supply unit 102 supplies power to the devices included in the power source systems A and B among the devices illustrated in FIG. 6, but stops power supply to the devices included in the power source systems C and D. In the second power saving mode, the power supply unit 102 stops power supply to the devices in the power source system C including the main CPU 250. Therefore, most operations provided by the multifunction peripheral 100 are disabled. However, the power supply unit 102 continues power supply to the respective devices in the power source system B including the sub CPU 240, whereby the user can perform an operation on the initial screen displayed on the operation unit 210.

The third power saving mode is a power mode in which power consumption reduces the most in the present exemplary embodiment, and is a power mode in which the power supply unit 102 supplies power to the devices included in the power source system A, but stops power supply to the devices included in the power source systems B to D. In the third power saving mode, the power supply unit 102 continues power supply to the NIC 130, the power saving switch 140, and the human sensor 150, and the multifunction peripheral 100 returns to the second power saving mode according to an interruption signal from them.

Figure 7:
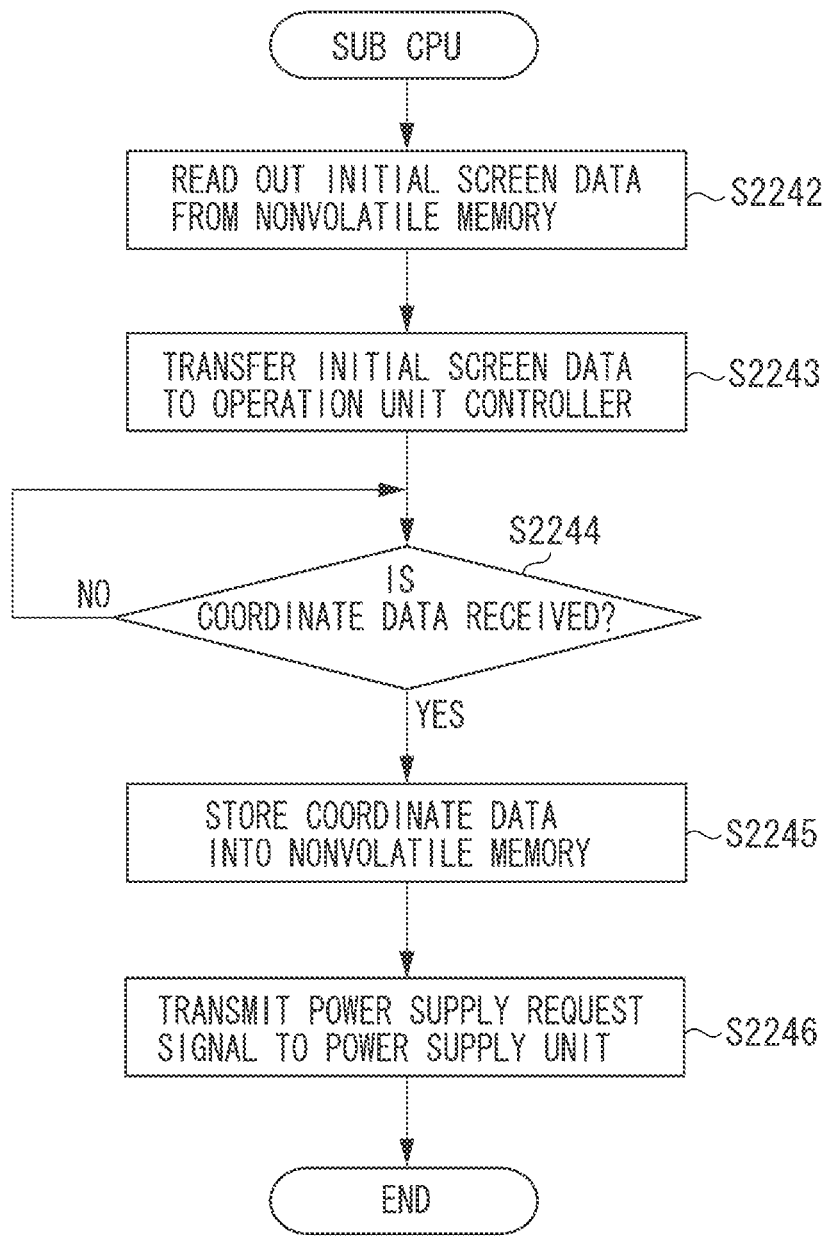
FIG. 7 is a flowchart illustrating an operation of a sub CPU according to the second exemplary embodiment.
Figure 8:
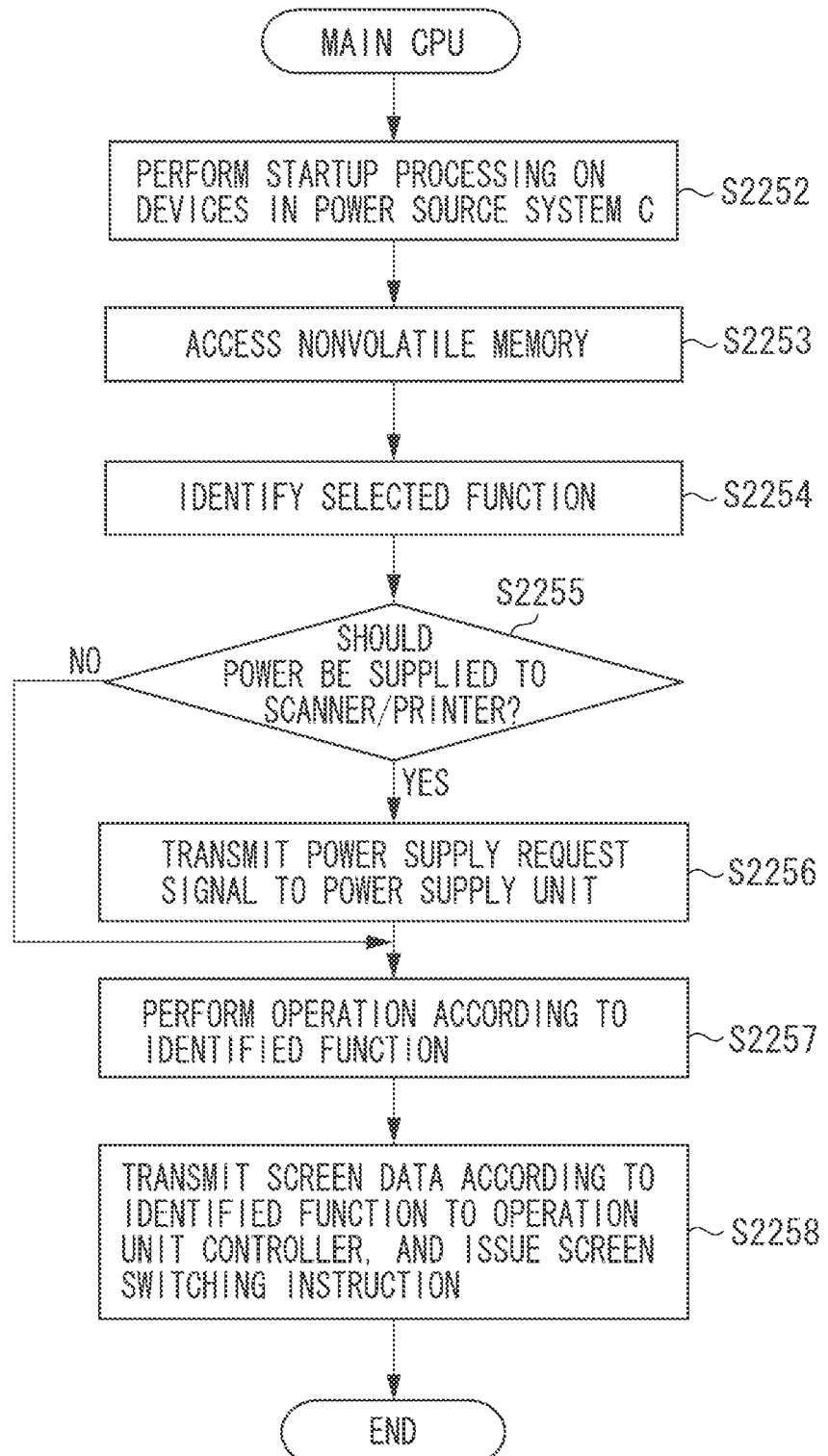
FIG. 8 is a flowchart illustrating an operation of a main CPU according to the second exemplary embodiment.

FIGS. 7 and 8 are flowcharts illustrating an operation until the multifunction peripheral 100 according to the second exemplary embodiment shifts from the third power saving mode to the normal power mode.

First, an operation of the sub CPU 240 will be described with reference to FIG. 7. FIG. 7 is a flowchart illustrating a processing procedure that the sub CPU 240 performs by reading out the program stored in the ROM 201. The processing illustrated in the flowchart of FIG. 7 starts in response to power supply from the power supply unit 102 to the sub CPU 240.

When power is supplied from the power supply unit 102, in step S2242, the sub CPU 240 reads out the initial screen data, which is stored in the nonvolatile memory 230 in advance. In step S2243, the sub CPU 240 transfers the read initial screen data to the operation unit controller 220. Then, upon receiving the screen data, the operation unit controller 220 displays the initial screen on the operation unit 210.

Subsequently, if the sub CPU 240 receives the coordinate data from the operation unit controller 220 (YES in step S2244), in step S2245, the sub CPU 240 stores the received coordinate data into the nonvolatile memory 230. Then, in step S2246, the sub CPU 240 transmits a power supply request signal to the power source control unit 110. Upon receiving this power supply request signal from the sub CPU 240, the power source control unit 110 instructs the power supply unit 102 to supply power to the respective units included in the power source system C. As a result, the multifunction peripheral 100 shifts from the second power saving mode to the first power saving mode.

Next, an operation of the main CPU 250 will be described. FIG. 8 is a flowchart illustrating an operation of the main CPU 250. The processing illustrated in the flowchart of FIG. 8 starts in response to power supply from the power supply unit 102 to the main CPU 250 in step S2246 illustrated in FIG. 7.

When power is supplied from the power supply unit 102, in step S2252, the main CPU 250 performs the startup processing such as setting the respective devices in the power source system C. During this startup processing, the main CPU 250 does not initialize the IO chip 260 and the image processing chips 280, unlike the first exemplary embodiment. Therefore, the main CPU 250 can complete the processing quickly compared to the first exemplary embodiment.

After the completion of the startup processing, in step S2253, the main CPU 250 accesses the nonvolatile memory 230. Then, in step S2254, the main CPU 250 identifies the function selected by the user based on the coordinate data stored in the nonvolatile memory 230. The process of step S2254 is similar to step S255 in the first exemplary embodiment.

Subsequently, in step S2255, the main CPU 250 determines whether power should be supplied to the devices in the power source system D to perform an operation corresponding to the function identified in step S2254. More specifically, if the function identified in step S2254 is any of the facsimile function, the copying function, the box function, and the scanning function, the main CPU 250 determines in step S2255 that power should be supplied to the devices in the power source system D (YES in step S2255). On the other hand, if the function identified in step S2254 is the web browser function or the setting/registration function, the main CPU 250 determines in step S2255 that power does not have to be supplied to the devices in the power source system D (NO in step S2255).

If the main CPU 250 determines that the identified function is any of the facsimile function, the copying function, the box function, and the scanning function (YES in step S2255), in step S2256, the main CPU 250 transmits a power supply request signal to the power source control unit 110. Upon receiving the power supply request signal from the main CPU 250, the power source control unit 110 instructs the power supply unit 102 to supply power to the respective units in the power source system D. When power is supplied to the devices in the power source system D, in step S2257, the main CPU 250 performs an operation corresponding to the function identified in step S2254. Then, in step S2258, the main CPU 250 generates screen data corresponding to the function identified in step S2254, and transfers the generated screen data to the operation unit controller 220. Further, the main CPU 250 issues a screen switching instruction to the operation unit controller 220.

Due to the above-described configuration and processing procedure, the multifunction peripheral 100 can display the screen on the operation unit 210 quickly when shifting from the third power saving mode, in which power consumption reduces the most, to the second power saving mode. Further, the main CPU 250 does not have to immediately react to an operation of the use's touching that display screen to perform processing corresponding thereto. As a result, it is possible to reduce the time required until the operation unit 210 of the apparatus becomes operable when the apparatus returns from the second power saving mode.

Further, according to the second exemplary embodiment, upon detecting human's approach by the human sensor 150, the power supply unit 102 starts power supply to the sub CPU 240, but does not start power supply to the main CPU 250. Instead, the power supply unit 102 starts power supply to the main CPU 250 in response to a user's operation on the initial screen displayed by the sub CPU 240. As a result, the multifunction peripheral 100 can avoid supplying power to the main CPU 250 unnecessarily.

Further, according to the second exemplary embodiment, the power source system of the multifunction peripheral 100 is divided into four systems to realize a reduction in the number of devices for which the main CPU 250 has to perform the startup processing, thereby reducing the time taken for the startup processing by the main CPU 250. As a result, the multifunction peripheral 100 can quickly start the operation corresponding to the function selected by the user on the initial screen.

In the second exemplary embodiment, the scanner 295 and the printer 305 are included in the same power source system, the power source system D, but they may be included in different power source systems. In this case, the multifunction peripheral 100 supplies power to the power source system of the scanner 295 only when an operation of reading an image from a document is necessary, and supplies power to the power source system of the printer 305 only when a print operation of printing an image is necessary.

Next, a third exemplary embodiment will be described with reference to FIG. 9. The third exemplary embodiment is different from the first exemplary embodiment in terms that the operation unit controller 220 displays the initial screen, instead of the sub CPU 240.

Figure 9:
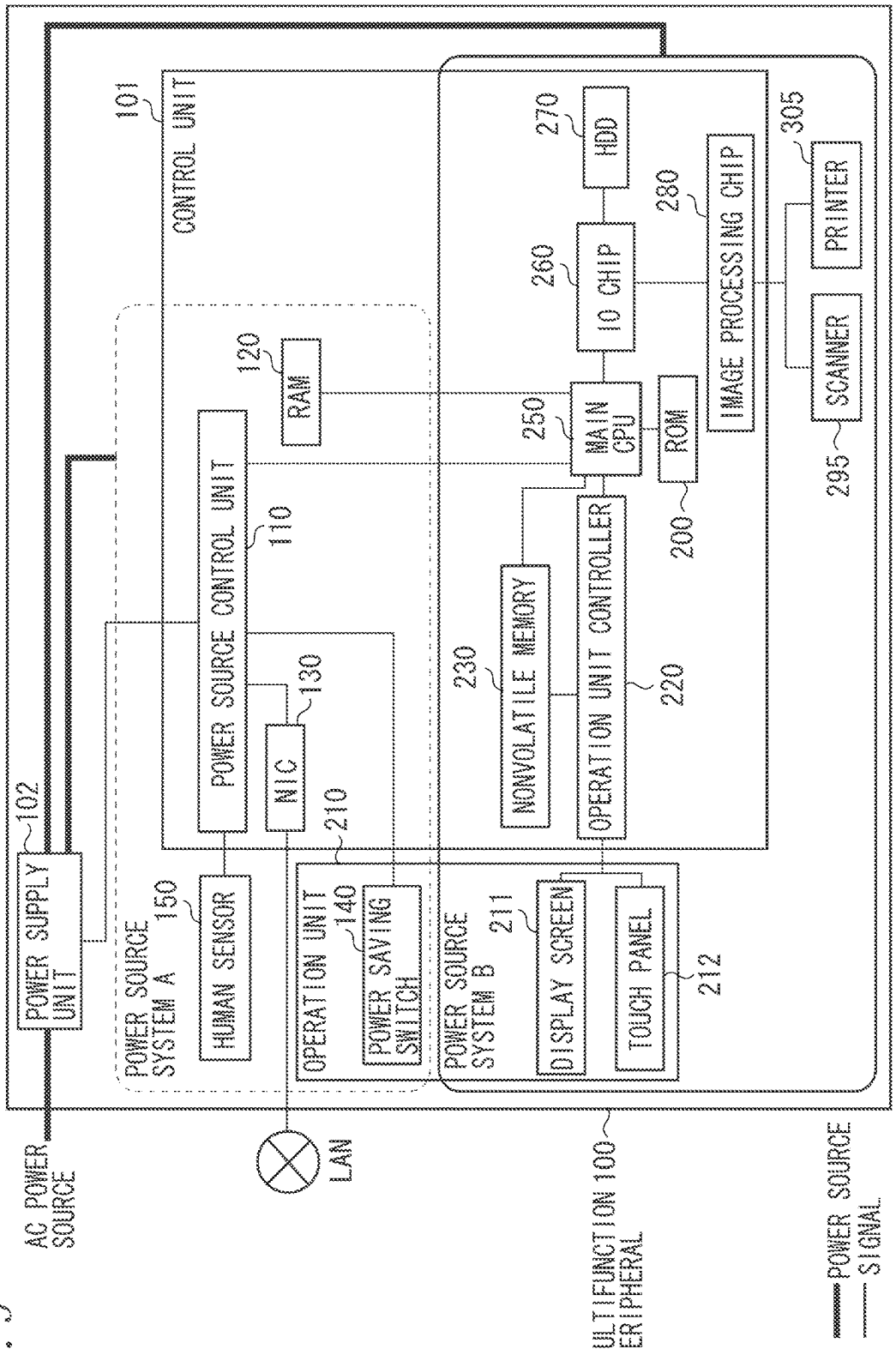
FIG. 9 illustrates a hardware configuration of a multifunction peripheral according to a third exemplary embodiment.

FIG. 9 illustrates a hardware configuration of the multifunction peripheral 100 according to the third exemplary embodiment. The multifunction peripheral 100 illustrated in FIG. 9 is similar to the first exemplary embodiment except that it does not include the sub CPU 240 in charge of control of the operation unit 210.

According to the third exemplary embodiment, when power is supplied, the operation unit controller 220 reads out the initial screen data, which is stored in the nonvolatile memory 230 in advance. Then, the operation unit controller 220 displays the initial screen on the display screen 211 of the operation unit 210. Further, the operation unit controller 220 detects the coordinate data of an area where the user touches on the initial screen, and stores the detected coordinate data into the nonvolatile memory 230. The main CPU 250 refers to this nonvolatile memory 230, and transmits a screen switching instruction. Upon receiving this screen switching instruction, the operation unit controller 220 switches the display from the currently displayed screen to a screen based on the screen data received together with the screen switching instruction.

Due to the above-described configuration and processing procedure, the multifunction peripheral 100 according to the third exemplary embodiment can provide similar effects to the first exemplary embodiment even with the configuration that does not include the sub CPU 240.

Next, a fourth exemplary embodiment will be described. The fourth exemplary embodiment is different from the first exemplary embodiment in terms that the sub CPU 240 displays not only the initial screen but also a screen of a next layer. The hardware configuration of the multifunction peripheral 100 according to the fourth exemplary embodiment is similar to the configuration illustrated in FIG. 1.

The nonvolatile memory 230 according to the fourth exemplary embodiment stores not only the initial screen data but also screen data for each of the functions (copying, scanning, facsimile, box, web browser, and setting/registration) of the multifunction peripheral 100.

Figure 10:
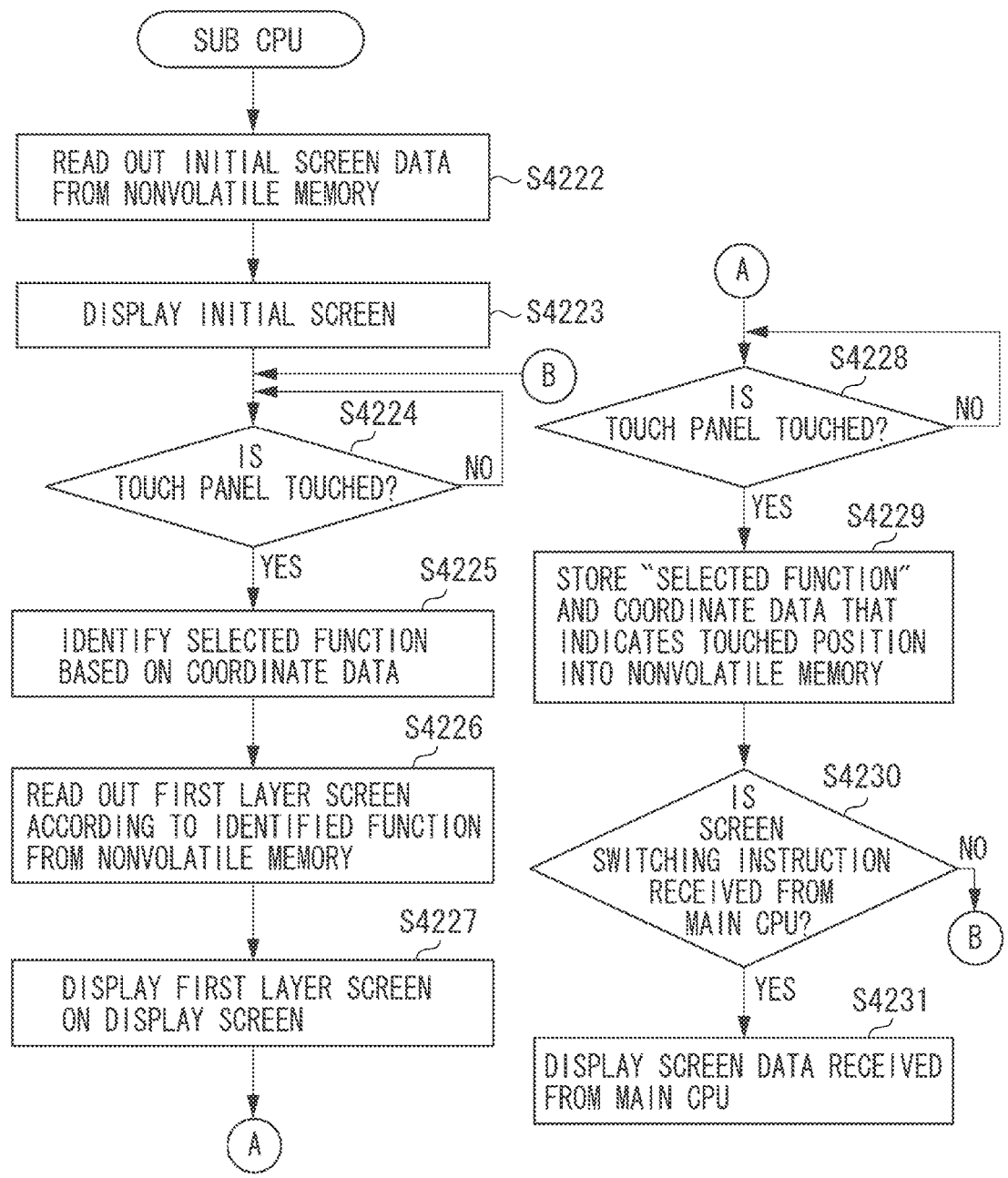
FIG. 10 is a flowchart illustrating an operation of a sub CPU according to a fourth exemplary embodiment.

FIG. 10 is a flowchart illustrating an operation of the sub CPU 240. The processing illustrated in the flowchart of FIG. 10 starts in response to power supply from the power supply unit 102.

When power is supplied, in step S4222, the sub CPU 240 reads out the initial screen data from the nonvolatile memory 230. In step S4223, the sub CPU 240 transfers the initial screen data to the operation unit controller 220, thereby controlling the display in such a manner that the initial screen is displayed on the display screen 211. Then, if the sub CPU 240 detects that the touch panel 212 is touched by the user (YES in step S4224), in step S4225, the sub CPU 240 acquires the coordinate data of the touched area, and identifies the function selected by the user based on the acquired coordinate data. Then, in step S4226, the sub CPU 240 reads out a first layer screen corresponding to the identified function from the nonvolatile memory 230. The first layer screen is a screen of a layer at least for each function. In step S4227, the sub CPU 240 displays the read first layer screen on the display screen 211.

Subsequently, if the sub CPU 240 detects that the touch panel 212 is touched by the user via the first layer screen (YES in step S4228), in step S4229, the sub CPU 240 stores the type of the selected function and coordinate data of the area pressed on the screen of each function into the nonvolatile memory 230 as the operation information. Then, if a screen switching instruction is received from the main CPU 250 (YES in step S4230), in step S4231, the sub CPU 240 switches the display to a screen based on the screen data received together with the screen switching instruction.

Due to the above-described processing flow, the multifunction peripheral 100 can quickly provide a display on the display screen 211 of the operation unit 210 when returning from the power saving mode. Further, the main CPU 250 does not have to immediately react to an operation of the user's touching that display screen to perform processing corresponding thereto. As a result, the multifunction peripheral 100 can reduce the time required until the operation unit 210 of the apparatus becomes operable when the multifunction peripheral 100 returns from the power saving mode. Further, according to the fourth exemplary embodiment, because the sub CPU 240 performs the screen switching processing corresponding to at least one selection operation instead of the main CPU 250 performing it, the multifunction peripheral 100 can quickly react to a user's selection operation even before the main CPU 250 completes the startup processing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-273639 filed Dec. 14, 2012, which is hereby incorporated by reference herein in its entirety.

What is claimed is:

1. An image forming apparatus comprising:
   a display unit;
   a first processing unit which causes the display unit to display a screen;
   a second processing unit which causes the display unit to display a first screen at least during startup of the first processing unit; and
   a storage unit,
   wherein the second processing unit stores, into the storage unit, coordinate data that indicates a coordinate of a position operated by a user on the first screen displayed by the display unit, and
   wherein the first processing unit causes the display unit to display a predetermined screen based on the coordinate data stored in the storage unit.

2. The image forming apparatus according to claim 1, wherein the coordinate data indicates a coordinate of a position touched by the user via the first screen.

3. The image forming apparatus according to claim 1, wherein the first screen is a function selection screen which is a screen that allows the user to select a function of the image forming apparatus.

4. The image forming apparatus according to claim 1, further comprising:
   a power saving switch which receives a user instruction to shift the image forming apparatus from a first power state in which power supply to the first processing unit is stopped to a second power state in which power is supplied to the first processing unit,
   wherein the second processing unit causes the display unit to display the first screen when the user instruction is received by the power saving switch.

5. The image forming apparatus according to claim 1, further comprising:
   a human sensor which senses a human and outputs an instruction based on a result of the sensing by the human sensor,
   wherein the second processing unit causes the display unit to display the first screen when the instruction is received from the human sensor.

6. A method for controlling an image forming apparatus including a display unit, a first processing unit which causes the display unit to display a screen, a second processing unit which causes the display unit to display a first screen at least during startup of the first processing unit, and a storage unit, the method comprising:
   storing, by the second processing unit, coordinate data into the storage unit, the coordinate data indicating a coordinate of a position operated by a user on the first screen displayed by the display unit; and causing, by the first processing unit, the display unit to display a predetermined screen based on the coordinate data stored in the storage unit.

7. The image forming apparatus according to claim 3, wherein the function selection screen is a screen for selecting a copy function.

8. The image forming apparatus according to claim 1, wherein the first screen is a screen for selecting a FAX function.

9. The image forming apparatus according to claim 1, wherein the first screen is a screen for selecting a scan function.

\* \* \* \* \*